(12) United States Patent
Kumler

(10) Patent No.: US 6,401,141 B1
(45) Date of Patent: Jun. 4, 2002

(54) ACCURATE AND RELIABLE PAGE SIZE SELECTION IN A POSTSCRIPT OUTPUT DEVICE

(75) Inventor: Mark Zeller Kumler, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/253,821

(22) Filed: Feb. 19, 1999

(51) Int. Cl.[7] .............................................. G06F 13/00
(52) U.S. Cl. ..................... 710/10; 358/1.2; 358/1.18; 358/449
(58) Field of Search ........................ 358/1.18, 448–449, 358/1.2; 382/197; 710/10, 15–19

(56) References Cited

U.S. PATENT DOCUMENTS

| | | | | |
|---|---|---|---|---|
| 5,052,834 A | * | 10/1991 | Feistel et al. ................. | 395/108 |
| 5,239,388 A | * | 8/1993 | Matsumoto .................. | 358/448 |
| 5,537,626 A | * | 7/1996 | Kraslavsky et al. ......... | 395/114 |
| 5,613,160 A | * | 3/1997 | Kraslavsky et al. .......... | 710/16 |
| 5,694,486 A | * | 12/1997 | Shigeeda et al. ........... | 382/197 |
| 6,208,770 B1 | * | 3/2001 | Gilman et al. .............. | 382/305 |
| 6,268,927 B1 | * | 7/2001 | Lo et al. ..................... | 358/1.15 |
| 6,310,622 B1 | * | 10/2001 | Asente ........................ | 345/441 |

OTHER PUBLICATIONS

"Postscript® Language Reference Manual", Second Edition, Adobe Systems Incorporated, Sep. 1998, pp. 226–255.

* cited by examiner

*Primary Examiner*—Christopher B. Shin
(74) *Attorney, Agent, or Firm*—Gates & Cooper LLP

(57) ABSTRACT

A method for performing accurate and reliable page size selection in a PostScript™ device. A PolicyReport procedure is downloaded into the device to perform the following steps. If the device is using a non-standard PaperSize Policy, then the procedure uses the PageSize SetPageDevice call; otherwise, the procedure loops through the PageSizes for each media source stored in the InputAttributes dictionary to find the nearest PageSize entry favoring non-rotated over rotated for identical match sizes. The loop is terminated when an exact match is found with no rotation or when all available paper sizes have been exhausted. The loop is optimized not to look for closest matches once it has found a perfect size match and to terminate when it has found a perfect non-rotated match.

18 Claims, 4 Drawing Sheets

ACCURATE AND RELIABLE PAGE SIZE SELECTION IN A POSTSCRIPT OUTPUT DEVICE

CROSS REFERENCE TO RELATED APPLICATIONS

This application is related to the following co-pending and commonly assigned patent applications:

U.S. patent application Ser. No. 09/253,473, filed on same date herewith, by Mark Z. Kumler, entitled "CONTROL B PROTOCOL FOR POSTSCRIPT DEVICES", and U.S. patent application Ser. No. 09/253,386, filed on same date herewith, by Mark Z. Kumler, entitled "POSTSCRIPT IMAGE PRINTING USING A DOWNLOADED HANDLER".

which applications are incorporated by reference herein.

BACKGROUND OF THE INVENTION

1. Field of the Invention

The present invention relates generally to computer-implemented printing systems, and in particular, to a method for performing accurate and reliable page size selection in a PostScript™ device.

2. Description of the Related Art

PostScript™ is a general purpose computer language developed by Adobe Systems, Inc. that has become a standard for device-independent output. PostScript™ is most commonly used for supplying page description information to output devices such as printers and can describe elements including text, graphics, and scanned images.

Many PostScript™ printers 116 have special hardware features, such as multiple paper trays with different sizes of paper, duplex printing, collation, finishing options, and so on. These features are modeled in a Page Device Dictionary and can be altered or selected by a SetPageDevice operator. If a feature is selected, but does not exist in the Page Device Dictionary, then a Policies Dictionary is accessed to determine what steps to perform in response thereto.

For example, the PageSize entry in the Page Device Dictionary is an array that defines the width and height of one or more media sources available in the device. The SetPageDevice operator invoked by a page description attempts to match the size selection of the page description with the size of the media sources available in the printer, within a specified tolerance. If a match cannot be made, a PageSize Policy procedure in the Policies dictionary is triggered to perform a specified series of steps.

Unfortunately, the steps performed by the PageSize Policy are unduly limited. Generally, these steps are limited to: (1) generating a configuration error; (2) ignoring the requested PageSize; (3) interacting with a human operator or print manager; (4) selecting the nearest available medium and adjusting the page to fit the medium; (5) selecting the next larger available medium and adjusting the page to fit the medium; (6) selecting the nearest available medium, but not adjusting the page, or (7) selecting the next larger available medium, but not adjusting the page. Therefore, there exists a need in the art for techniques that provide more flexibility in the handling of mismatched page size requests in PostScript™ devices.

SUMMARY OF THE INVENTION

To overcome the limitations in the prior art described above, and to overcome other limitations that will become apparent upon reading and understanding the present specification, the present invention discloses a method and apparatus for performing accurate and reliable page size selection in a PostScript™ device. A PolicyReport procedure is downloaded into the device to perform the following steps. If the device is using a non-standard PaperSize Policy, then the procedure uses the PageSize SetPageDevice call; otherwise, the procedure loops through the PageSizes for each media source stored in the InputAttributes dictionary to find the nearest PageSize entry favoring non-rotated over rotated for identical match sizes. The loop is terminated when an exact match is found with no rotation or when all available paper sizes have been exhausted. The loop is optimized not to look for closest matches once it has found a perfect size match and to terminate when it has found a perfect non-rotated match.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is understood that other embodiments may be utilized and structural changes may be made without departing from the scope of the present invention.

Hardware Environment

Figure 1A:
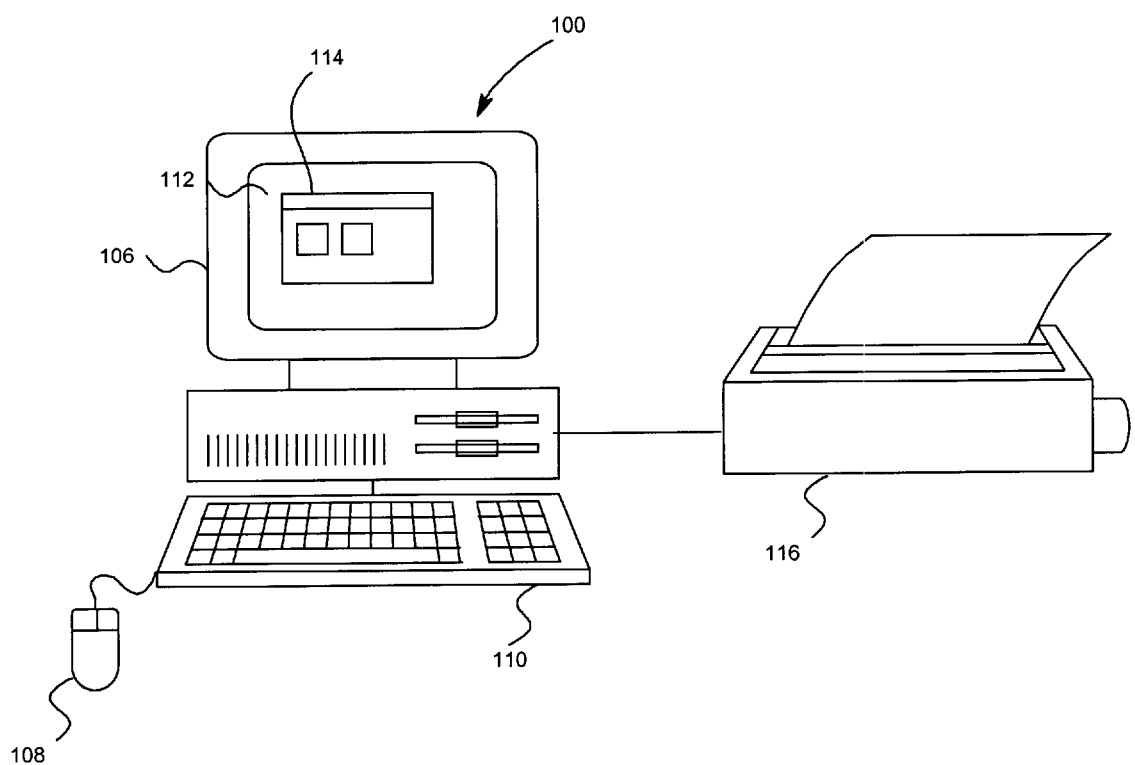
FIGS. 1A and 1B are respective illustrations of a hardware environment for the preferred embodiment of the present invention.
Figure 1B:
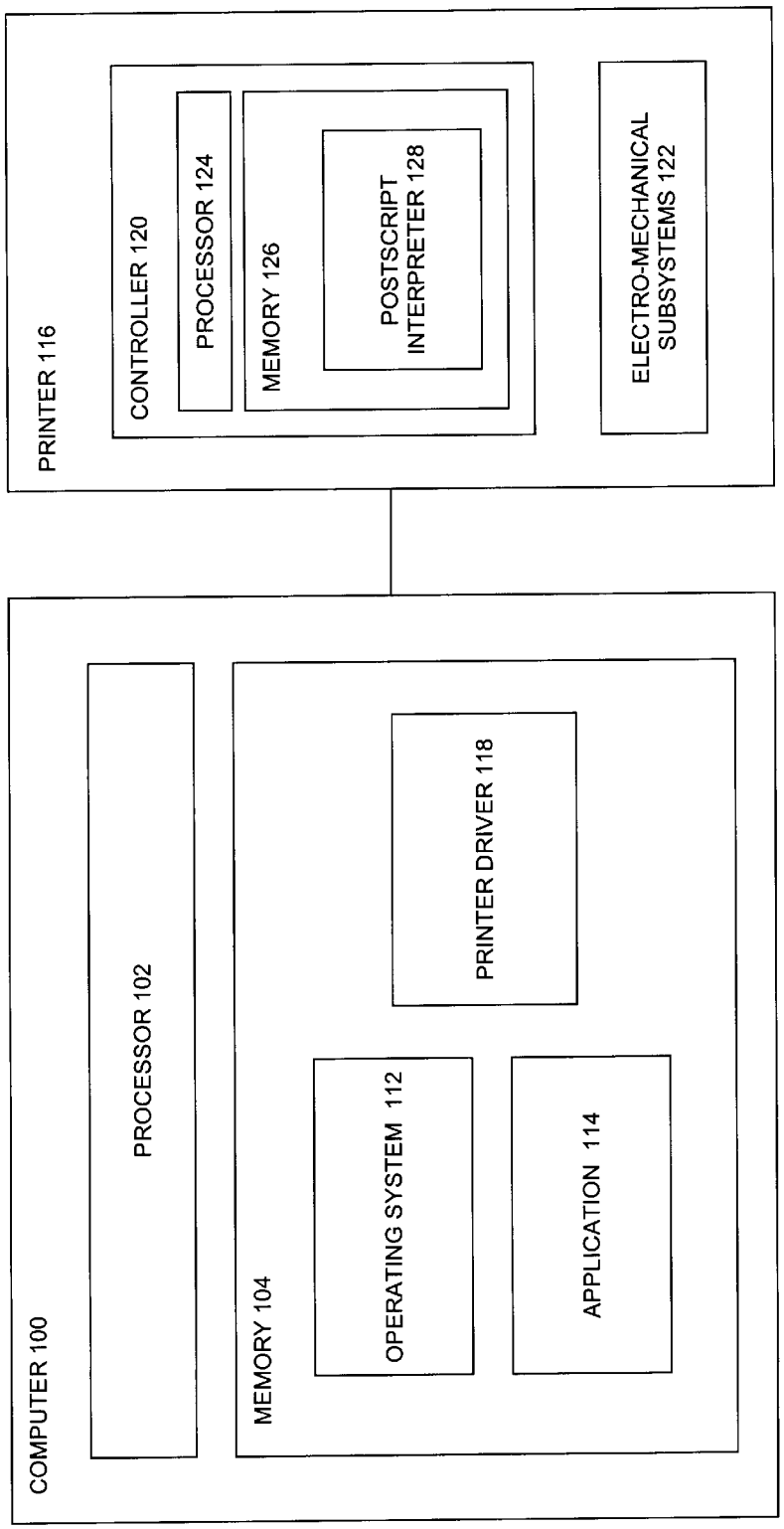

FIGS. 1A and 1B are respective illustrations of a hardware environment for the preferred embodiment of the present invention. The computer 100, generally includes, inter alia, a processor 102, random access memory (RAM) 104, data storage devices (e.g., hard, floppy, and/or CD-ROM disk drives, etc.), data communications devices (e.g., modems, network interfaces, etc.), monitor 106, mouse pointing device 108, and keyboard 110. Those skilled in the art will recognize that any combination of the above components, or any number of different components, peripherals, and other devices, may be used with the computer 100.

The computer 100 usually operates under the control of an operating system 112, which is indicated by the display shown on the monitor 106. The operating system 112 controls the operation of one or more application programs 114, which are indicated by a window shown on the monitor 106. In a preferred embodiment, the application program 114 is a CAD program or other graphics program, although other programs could benefit from the present invention as well.

The application program 114 prints information, such as text, images, etc., on a printer 116 by means of a printer driver 118. In the preferred embodiment, the printer 116 is a PostScript™ printer 116 and is recognized as such by the application program 114. In a preferred embodiment, the printer driver 118 includes instructions necessary for programming the PostScript™ with a procedure that correctly selects paper sizes, as described in more detail below.

The printer 116 includes both a controller 120 and the necessary electro-mechanical subsystems 122 to effect the desired printing. The controller 120 generally includes a processor 124 and a memory 126. The controller 120 usually operates under the control of a PostScript™ interpreter 128.

Generally, the operating system 110, application program 112, printer driver 118, and PostScript™ interpreter 128 each comprises instructions and/or data that are embodied in or retrievable from a computer-readable device, medium, or carrier, e.g., a memory, a data storage device, a remote device coupled to the computer via a data communications device, etc. Moreover, these instructions and/or data, when read, executed, and/or interpreted by the computer 100 and/or controller 120 cause the computer 100 and/or controller 120 to perform the steps necessary to implement and/or use the present invention.

Thus, the present invention may be implemented as a method, apparatus, or article of manufacture using standard programming and/or engineering techniques to produce software, firmware; hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIGS. 1A and 1B are not intended to limit the present invention, and that other alternative hardware environments may be used without departing from the scope of the present invention. Indeed, those skilled in the art will recognize that any combination of the above components, or any number of different components, including computer programs, peripherals, and other devices, may be used to implement the present invention, so long as similar functions are performed thereby.

Page Device Dictionary

Many PostScript™ printers 116 have special hardware features, such as multiple paper trays with different sizes of paper, duplex printing, collation, finishing options, and so on. The current internal state of a PostScript™ printer 116 is modeled as a Page Device Dictionary maintained by the PostScript™ interpreter 128, wherein the Page Device Dictionary contains one or more key-value pairs that identify what printer 116 features are available for use by the application program 114. The keys in the Dictionary represent particular printer 116 features or processing options and the values represent the current settings of those features or options.

The key-value pairs in a Page Device Dictionary are divided into the following categories.

Input media selection entries provide information that can be used to select the appropriate type of paper or other media.

Roll media entries provide additional information that is usually relevant only to devices that feed media from a continuous roll, such as plotters or typesetters.

Processing and output entries specify how pages are to be rendered onto the media and how the media are to be processed thereafter.

Policy and special action entries specify how requests for unsupported features are to be handled and define special actions to be performed when the device is installed and before and after each page is printed.

These classifications are not rigid; entries in different categories can sometimes interact with each other.

The Page Device Dictionary can be altered by the SetPageDevice operator sent to the PostScript™ interpreter 128 by the application program 114 or printer driver 118. The SetPageDevice operator is used to specify the processing requirements and select features in a page description. Also, SetPageDevice is used by the printer driver 118 or application 114 to specify a default printer 116 setup or configuration parameters to be used when not specified by a page description. The operand of SetPageDevice is a dictionary containing one or more key-value pairs that request particular printer 116 features or processing options.

SetPageDevice alters the internal state of the PostScript™ interpreter 128 and its effects are cumulative over multiple executions. SetPageDevice merges new requests into the existing Page Device Dictionary. The specification of a particular key-value pair persists through subsequent calls to SetPageDevice until overridden explicitly or until the Dictionary is restored to some previous state.

Since the effects of SetPageDevice are cumulative, a PostScript™ language program or page description downloaded to the printer 116 by the application 114 or printer driver 118 can make independent calls to SetPageDevice, each requesting particular features or processing options, but leaving the settings for other features undisturbed. This allows different options to be specified at different times; in particular:

1. The application 114 or printer driver 118 that is controlling the printer 116 can invoke SetPageDevice, as part of an unencapsulated job, to configure the available media sources, to establish policies for dealing with unsatisfied requests, and to establish default values for other device options.

2. When the application 114 or printer driver 118 generates a page description, it can include a call to SetPageDevice specifying parameters that reflect assumptions made in formatting the document.

3. When the application 114 or printer driver 118 requests printing, an additional call to SetPageDevice can be prepended to the page description to specify processing options, such as number of copies, etc.

The PostScript™ printer 116 generally supports one or more media sources and one or more media destinations that are arbitrarily numbered by small integers. The PostScript™ interpreter 128 includes two subsidiary dictionaries of the Page Device Dictionary, known as InputAttributes and OutputAttributes, that describe the attributes of each of the sources and destinations, respectively. The SetPageDevice operator matches the media requirements specified by the page description against the attributes described in InputAttributes and OutputAttributes to determine which media source and media destination to select.

The InputAttributes dictionary may contain entries such as PageSize, MediaColor, MediaWeight, and MediaType. The OutputAttributes dictionary may contain entries such as OutputType. A page description generated by the application 114 specifies its processing requirements by including appropriate entries, such as PageSize, MediaColor, MediaWeight, MediaType and OutputType, in the dictionary operand of its call to SetPageDevice.

Matching Requests With Attributes

Each time SetPageDevice is executed, it performs the following steps to match media requests with media attributes in order to select a source and destination:

1. The entries in the SetPageDevice operand dictionary are merged with the entries of the Page Device Dictionary.

The resulting set of key-value pairs is considered together, without regard to which ones are specified in the SetPageDevice operand dictionary and which ones are inherited from the Page device Dictionary.

2. The PageSize, MediaColor, MediaWeight, and MediaType entries whose values are not null are collected and treated as an "input media request", where the entries whose values are null are ignored.

3. The entries in the InputAttributes dictionary are enumerated. Each entry's key is an integer identifying a media source; its value is a dictionary containing the attributes of the media. For each entry in the input media request (step 2), its value is compared with the corresponding media attribute. If all the values are equal, the input media request matches the media source.

4. If the result of step 3 is that the input media request matches exactly one media source, then that source is selected. If there is more than one match, then the media source with the highest priority is selected. If there are no matches at all, the Policies Dictionary is accessed to determine what steps to perform.

5. Similarly, steps 2 through 4 are performed to select a media destination, using the OutputType entry as an "output media request" and the OutputAttributes dictionary as a description of the attributes of the available destinations.

Matching PageSize Requests With PageSize Attributes

The PageSize entry is an array entry that defines the overall page size that was assumed during generation of the page description by the application 114 or printer driver 118. PageSize is an array of two numbers, [width height], indicating the width and height of the assumed page, expressed in units of the default coordinate system (in the preferred embodiment, each unit is $1/72$ inch, although other dimensions may be used as well). These are the overall dimensions of the page, including borders, if any. The lower-left corner and upper-right corner of the assumed physical page are at user space coordinates (0, 0) and (width, height), respectively.

As noted above, the SetPageDevice operator attempts to match the size requirements of the pages with the media sizes currently available in the printer 116. Each media size is considered to be available in either of two orientations. Whether the media size is expressed as [width height] or [height width] is immaterial insofar as matching is concerned. Similarly, the orientation of media in the printer 116 is unspecified and varies from one device to another. The PostScript™ interpreter 128 transforms the page from user space to device space, so that the long and short dimensions specified by PageSize are oriented with the long and short dimensions of the physical media.

The tolerance for matching PageSize with an available media size is 5 default user space units in either dimension (e.g., $5/72$ inch in the preferred embodiment, although other dimensions may be used as well). A match falling within this tolerance is considered to be exact. Failure to match any available media within this tolerance triggers the PageSize Policy specified in the Policies dictionary.

Policies Dictionary

The Policies Dictionary is a subsidiary dictionary of the Page Device Dictionary maintained by the PostScript™ interpreter 128 that contains one or more key-value pairs that specific what steps to be performed when a call to SetPageDevice cannot be satisfied. The PostScript™ interpreter 128 then performs these steps as required.

The Policies Dictionary can be altered by the SetPageDevice operator. Ordinarily, a page description composed by the application 114 or printer driver 118 would not alter the Policies Dictionary; and the Policies Dictionary would only be changed only by a human operator or by system management software in control of the printer 116. However, if the application 114 or printer driver 118 requests special policies when submitting a print job, it is appropriate for the application 114 or printer driver 118 to insert a SetPageDevice command to change the Policies Dictionary at the beginning of the page description.

For example, the application 114 or printer driver 118 might consider it essential that a particular job use certain features of the printer 116. Moreover, if the features are not available, then the application 114 or printer driver 118 might specify that the job be rejected instead of being executed with the feature ignored.

The Policy Dictionary contains an overall policy and can optionally contain individual policies (values) for particular named features (keys). A policy is an integer that specifies a choice of one of several ways to handle an unsatisfied request.

Inability to satisfy a request arises in two situations:

The printer 116 does not support the requested feature. For example, duplex printing is requested, but the printer 116 does not have duplex printing capability.

The printer 116 supports the requested feature, but cannot achieve the requested value at the moment. For example, an A4-size page is requested when the A4 paper tray is not currently installed in the printer 116.

For most features, there are three policy choices: generate an error, ignore the request, or interact with a human operator. For PageSize requests, there are additional policy choices.

When a requested feature (other than PageSize) cannot be satisfied and the feature's name is not present as a key in the Policies Dictionary, then the value associated with the PolicyNotFound key in the Policies Dictionary specifies the policy to use, according to the following:

0—Generate a configuration error, i.e., do not attempt recovery but simply terminate execution.

1—Ignore the feature request. This is the usual default policy in most printers 116.

2—Interact with a human operator or print manager to determine what steps to perform. The semantics of this policy vary among different devices and environments. Some devices issue a message (on a front panel, for example) indicating an operator action that is required, and then wait for confirmation. Other devices have no ability to interact with an operator and generate a configuration error. The details are device dependent.

When a requested feature (other than PageSize) cannot be satisfied and the feature's name is present as a key in the Policies Dictionary, then the value associated with the key specifies the policy to use. The policy is an integer code whose meaning is similar to that specified above for PolicyNotFound. Any key that can appear in a dictionary operand supplied to SetPageDevice may also be used as a key in the Policies Dictionary.

When-the PageSize cannot be matched with any available media (in the preferred embodiment, within a tolerance of 5 units, although other tolerances could be used as well) and PageSize is present as a key in the Policies Dictionary, then the value associated with the PageSize key specifies the policy to use as follows:

0—Generate a configuration error, as described above for PolicyNotFound. This is the usual default policy in most devices.

1—Ignore the requested PageSize.

2—Interact with a human operator or print manager, as described above for PolicyNotFound.

3—Select the nearest available medium and adjust the page to fit. This adjustment is described below.

4—Select the next larger available medium and adjust the page to fit. This adjustment is described below.

5—Select the nearest available medium, but do not adjust the page.

6—Select the next larger available medium, but do not adjust the page.

Note that the nearest size is the one closest in area to the requested size, wherein the next larger size is the one that is at least as large as the requested size in both width and height and is smallest in area. If the policy is to select the next larger size, but no larger size is available, then the nearest size is used.

Further, pages are adjusted by scaling the page image (if necessary) to fit the medium, and then centering the image on the medium. Specifically, adjustment comprises the following steps:

1. If the selected medium is smaller than the requested PageSize in either dimension, then the page image is scaled to fit the medium in the most restrictive dimension. Scaling is the same in both dimensions so as to preserve the page's aspect ratio (height to width). No scaling is performed if the selected medium is at least as large as the requested PageSize in both dimensions.

2. The page image is centered on the medium along both dimensions.

The effect of this adjustment is to set up a "virtual page" conforming to the requested PageSize (scaled down if necessary) centered on the physical medium. The origin of user space is the lower-left corner of the virtual page, not of the physical medium. The PageSize in the resulting Page Device Dictionary is the PageSize that was requested, not that of the physical medium.

In the case where the page is not adjusted, the default user space is not scaled and is aligned with its origin at the lower-left corner of the medium. The effect is precisely as if the medium's PageSize had been requested in the first place. If the actual PageSize is smaller than the requested one along either dimension, the page image will be clipped.

PolicyReport Procedure

The limited set of built-in policies for handing unsatisfied requests can be augmented by use of the PolicyReport. PolicyReport is a key-value pair in the Policies Dictionary whose key is PolicyReport and whose value identifies a procedure. The PolicyReport procedure is called by the PostScript™ interpreter 128 upon successful completion of SetPageDevice, if SetPageDevice needed to consult the Policies Dictionary in order to handle one or more unsatisfied feature requests. Note that SetPageDevice does not call PolicyReport if it was able to satisfy all requests without consulting the Policies Dictionary or if it terminated unsuccessfully with a configuration error.

Before calling PolicyReport, SetPageDevice constructs a dictionary and pushes it on the operand stack. The dictionary contains one entry for each requested feature that was initially unsatisfied. The key is the name of the feature that was requested and the value is the integer policy code that was obtained from the Policies Dictionary. The PolicyReport procedure is expected to consume this dictionary from the stack.

There are two main uses for a PolicyReport procedure.

It can transmit a notification to the human operator or print manager, warning that one or more requests were unsatisfied and that substitute actions have been taken.

It can inspect the resulting device dictionary and perhaps make additional alterations. This provides additional flexibility when the standard set of policy choices is found to be inadequate.

Customized PageSize Selection

The preferred embodiment of the present invention provides a PolicyReport procedure that performs the following steps. If the printer is using a non-standard PaperSize Policy, then the procedure uses the PageSize SetPageDevice call; otherwise, the procedure loops through the PageSizes for each media source stored in the InputAttributes dictionary to find the nearest PageSize entry favoring non-rotated over rotated for identical match sizes. The loop is terminated when an exact match is found with no rotation or when all available paper sizes have been exhausted. The loop is optimized not to look for closest matches once it has found a perfect size match and to terminate when it has found a perfect non-rotated match.

These steps solve a number of issues with PostScript™ printers 116. The methods used by PostScript™ to select paper size (i.e., SetPageDevice via PageSize Policy and PageSize) fail to function on at least some printers 116, for one reason or another. The logic of the preferred embodiment of the present invention works on all known devices by going a level deeper than the standard "accepted" paper size selections and by handling some undocumented problems in a consistent and reasonable manner.

For example, certain Level 2 PostScript™ devices have special built-in "escapes" to handle deficiencies in their original Level 2 logic, which are handled correctly by this procedure. In addition, certain devices do not handle landscape versus portrait representations of the paper correctly (even though this is supposed to be handled automatically by the PostScript™ interpreter 128), which are handled correctly by this procedure. Further, some PostScript™ printers do not completely or correctly form the PageSize entries of the Page Device Dictionary, so that attempting to select a smaller sheet size on roll feeds results in the larger stored size being selected, which are handled correctly by this procedure. In contrast, the preferred embodiment of the present invention always selects the correct PageSize, if available, from the most appropriate automatic feed device available to the printer 116.

General Logic

Figure 2:
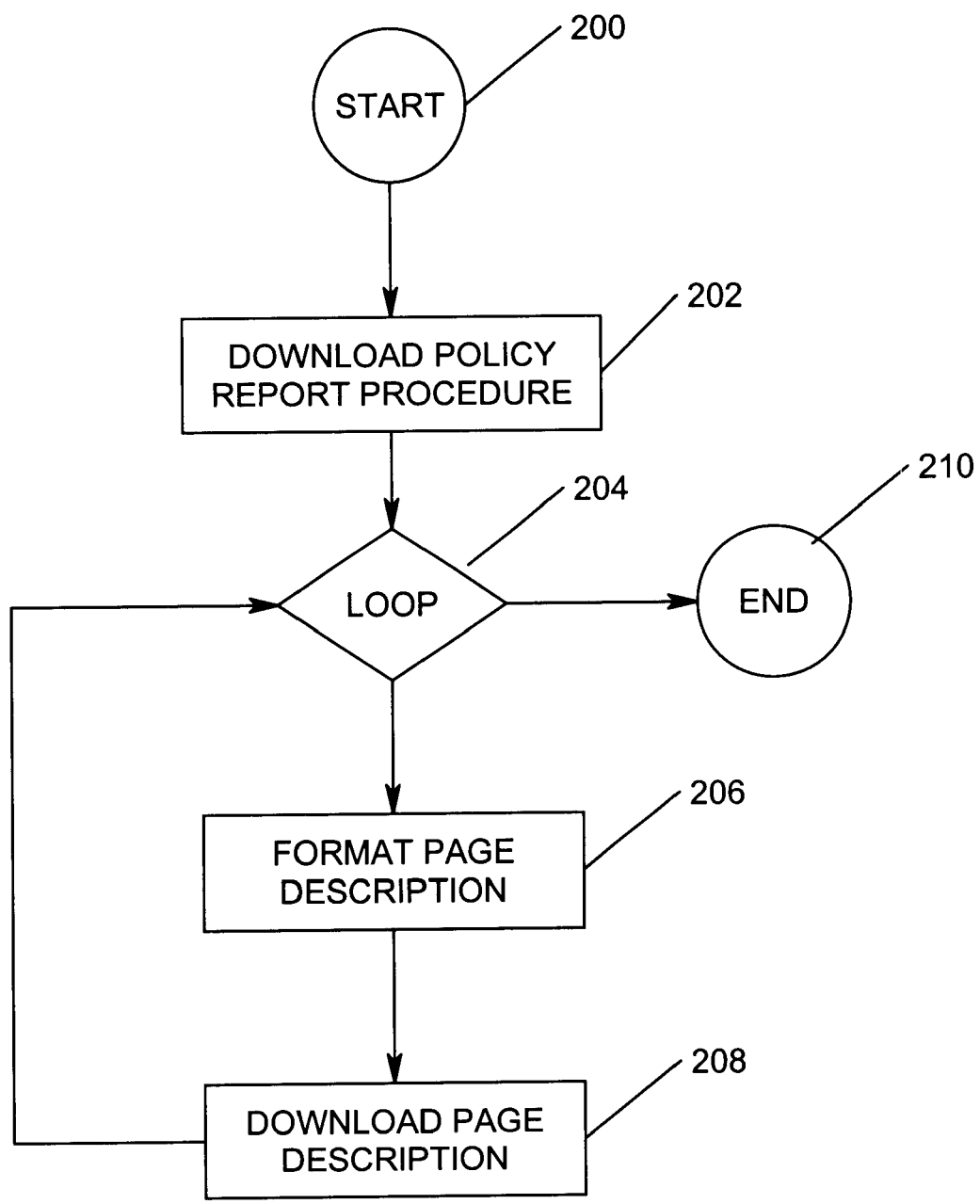
FIG. 2 illustrates the general logic performed by an application or printer driver according to the preferred embodiment of the present invention.
Figure 3:
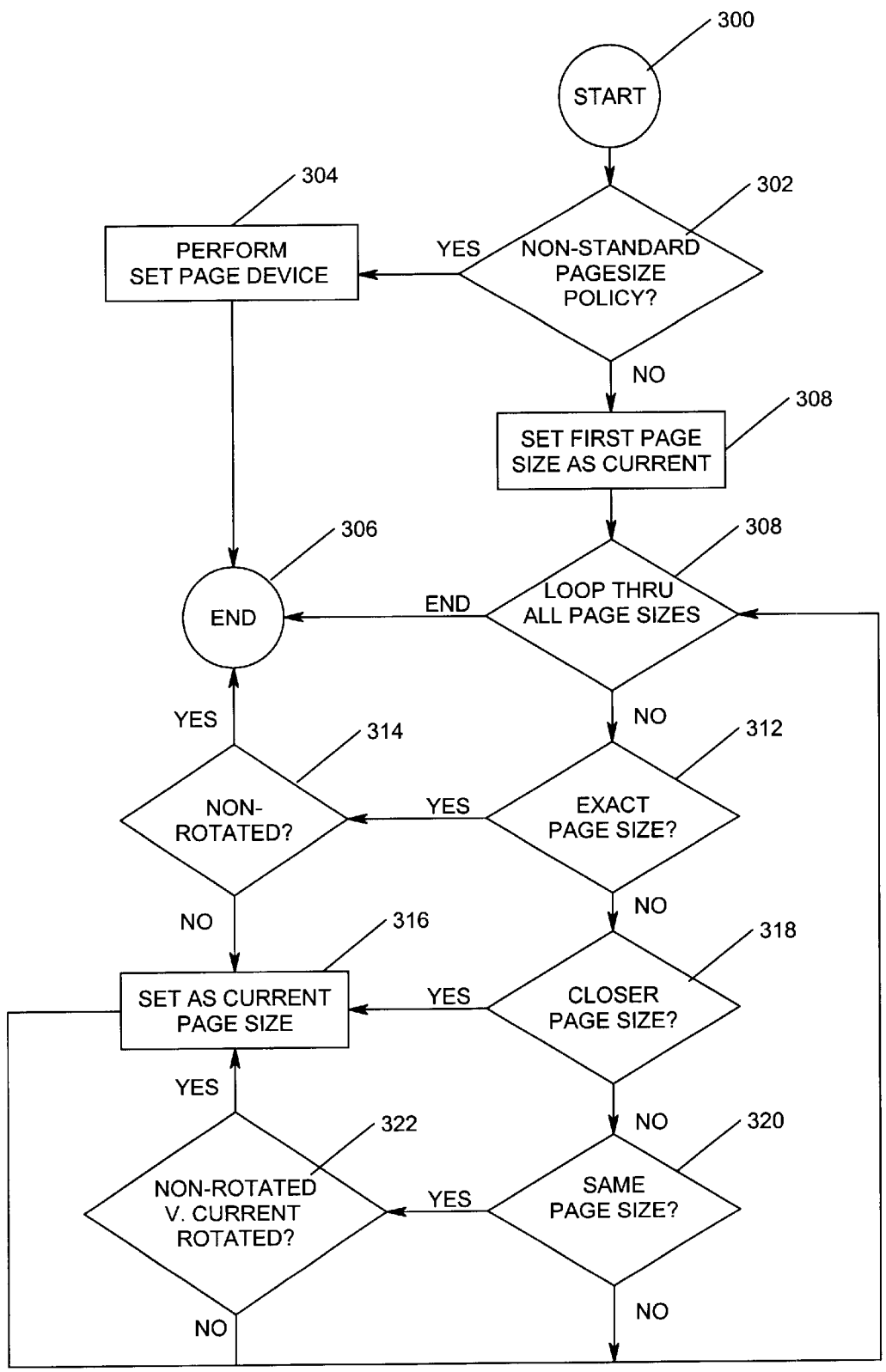
FIG. 3 illustrates the general logic performed by a PostScript™ interpreter according to the preferred embodiment of the present invention.

FIGS. 2 and 3 are flowcharts that illustrate the general logic of the present invention. Specifically, FIG. 2 illustrates the general logic performed by the application 114 or printer driver 118 according to the preferred embodiment of the present invention and FIG. 3 illustrates the general logic performed by the PostScript™ interpreter 128 according to the preferred embodiment of the present invention.

Referring to FIG. 2, Block 200 represents the start of the logic for the application 114 and/or the printer driver 118.

Block 202 represents the downloading of the PolicyReport procedure to the printer 116, wherein this step may be performed by invoking SetPageDevice, as part of an unencapsulated job or as part of a page description.

Blocks 204–210 represent an (optional) loop for formatting a page description (Block 206) and then downloading the page description to the printer 116 (Block 206). One or more page descriptions may be downloaded in this loop.

Thereafter, the logic terminates at Block 210.

Referring to FIG. 3, Block 300 represents the start of the logic for the PolicyReport procedure executed by the PostScript™ interpreter 128. As described above, the PolicyReport procedure is performed upon successful completion of SetPageDevice, if SetPageDevice needed to consult the Policies Dictionary in order to handle one or more unsatisfied feature requests.

Block 302 is a decision block that represents the PolicyReport procedure determining whether the printer 116 is using a non-standard PaperSize Policy. If so, control transfers to Block 304; otherwise, control transfers to Block 306.

Block 304 represents the PolicyReport procedure performing SetPageDevice call using the specified PageSize. Thereafter, control transfers to Block 306.

Block 306 represents the PolicyReport procedure terminating the logic.

Block 308 represents the PolicyReport procedure setting the PageSize for the first media source in the InputAttributes Dictionary as the "current" PageSize.

Blocks 310–322 represent a loop that is performed by the PolicyReport procedure through the PageSizes for each media source stored in the InputAttributes Dictionary. Upon completion of the loop, control transfers to Block 306.

Block 312 is a decision block that represents the PolicyReport procedure determining whether the PageSize for the media source stored in the InputAttributes Dictionary currently being examined is an exact match for the PageSize requested by the page description. If so, control transfers to Block 314; otherwise, control transfers to Block 318.

Block 314 is a decision block that represents the PolicyReport procedure determining whether the PageSize for the media source stored in the InputAttributes Dictionary currently being examined does not require the page to be rotated to fit thereon (i.e., based on the [width height] values associated with the PageSize key). If so, control transfers to Block 306; otherwise, control transfers to Block 316.

Block 316 represents the PolicyReport procedure setting the PageSize for the media source stored in the InputAttributes Dictionary currently being examined as the "current" PageSize.

Block 318 is a decision block that represents the PolicyReport procedure determining whether the PageSize for the media source stored in the InputAttributes Dictionary currently being examined is a closer match for the PageSize requested by the page description than the "current" PageSize. If so, control transfers to Block 316; otherwise, control transfers to Block 320.

Block 320 is a decision block that represents the PolicyReport procedure determining whether the PageSize for the media source stored in the InputAttributes Dictionary currently being examined is the same as the "current" PageSize. If so, control transfers to Block 322; otherwise, control transfers to Block 310.

Block 322 is a decision block that represents the PolicyReport procedure determining whether the PageSize for the media source stored in the InputAttributes Dictionary currently being examined does not require the page to be rotated to fit thereon (i.e., based on the [width height] values associated with the PageSize key) and the "current" PageSize does require the page to be rotated to fit thereon. If so, control transfers to Block 316; otherwise, control transfers to Block 310.

Conclusion

This concludes the description of the preferred embodiment of the invention. The following describes some alternative embodiments for accomplishing the present invention.

For example, any type of PostScript™ output device, other than printers, could be used with the present invention. In addition, any type of computer program, device driver, application program, or operating system having a need to use PostScript™ could benefit from the present invention.

The foregoing description of the preferred embodiment of the invention has been presented for purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for selecting from among a plurality of available media sources in an output device, each of the available media sources having at least one page size, comprising:
 (a) downloading a procedure to the output device; and
 (b) invoking the procedure in order to handle one or more unsatisfied feature requests, wherein the invoked procedure performs the following steps:
  (1) if the unsatisfied feature request uses a non-standard page size, then terminating the procedure; and
  (2) if the unsatisfied feature request uses a standard page size, then performing the following steps:
   (i) comparing one or more page sizes for the available media sources with a desired page size; and
   (ii) selecting a nearest one of the compared page sizes for the available media sources while favoring non-rotated media sources over rotated media sources.

2. The method of claim 1, wherein the output device is a printer.

3. The method of claim 1, wherein the output device is a PostScript™ device.

4. The method of claim 1, wherein the steps (i) and (ii) comprise a loop and the loop is terminated when all of the page sizes for the available media sources have been examined.

5. The method of claim 1, wherein the steps (i) and (ii) comprise a loop and the loop is terminated when an exact match is found between the desired page size and one of the compared page sizes for a non-rotated media source.

6. The method of claim 1, wherein the steps (i) and (ii) comprise a loop and the loop is optimized not to look for closest matches once it has found an exact match between the desired page size and one of the compared page sizes for a non-rotated media source.

7. The method of claim 1, wherein the steps (i) and (ii) comprise a loop and the loop is optimized to favor non-rotated media sources over rotated media sources for matches nearest one of the compared page sizes for the available media sources.

8. The method of claim 1, wherein the procedure is downloaded into the output device by an unencapsulated job.

9. The method of claim 1, wherein the procedure is downloaded into the output device by a page description.

10. An output device, comprising:
 (a) a plurality of available media sources, each of the available media sources having at least one page size;
 (b) a processor for performing the following functions:
  (1) receiving a procedure downloaded to the output device; and
  (2) invoking the procedure in order to handle one or more unsatisfied feature requests, the invoked procedure performing the following functions:
   (i) if the unsatisfied feature request uses a non-standard page size, then terminating the procedure; and
   (ii) if the unsatisfied feature request uses a standard page size, then performing the following functions:

(A) comparing one or more page sizes for the available media sources with a desired page size; and (B) selecting a nearest one of the compared page sizes for the available media sources while favoring non-rotated media sources over rotated media sources.

11. The output device of claim 10, wherein the output device is a printer.

12. The output device of claim 10, wherein the output device is a PostScript™ device.

13. The output device of claim 10, wherein the functions (A) and (B) comprise a loop and the loop is terminated when all of the page sizes for the available media sources have been examined.

14. The output device of claim 10, the functions (A) and (B) comprise a loop and the loop is terminated when an exact match is found between the desired page size and one of the compared page sizes for a non-rotated media source.

15. The output device of claim 10, wherein functions (A) and (B) comprise a loop and the loop is optimized not to look for closest matches once it has found an exact match between the desired page size and one of the compared page sizes for a non-rotated media source.

16. The output device of claim 10, wherein the functions (A) and (B) comprise a loop and the loop is optimized to favor non-rotated media sources over rotated media sources for matches nearest one of the compared page sizes for the available media sources.

17. The method of claim 10, wherein the procedure is downloaded into the output device by an unencapsulated job.

18. The method of claim 10, wherein the procedure is downloaded into the output device by a page description.

* * * * *

UNITED STATES PATENT AND TRADEMARK OFFICE
CERTIFICATE OF CORRECTION

PATENT NO.     : 6,401,141 B1
DATED          : June 4, 2002
INVENTOR(S)    : Mark Zeller Kumler It is certified that error appears in the above-identified patent and that said Letters Patent is hereby corrected as shown below:

<u>Column 11,</u>
Line 16, after "10," insert -- wherein --.

Signed and Sealed this

Twenty-seventh Day of May, 2003

JAMES E. ROGAN
*Director of the United States Patent and Trademark Office*